United States Patent Office 3,402,027
Patented Sept. 17, 1968

3,402,027
METHOD OF SEPARATING BERKELIUM FROM CERIUM
Fletcher L. Moore, Knoxville, Tenn., assignor to the United States of America as represented by the United States Atomic Energy Commission
No Drawing. Filed Feb. 23, 1968, Ser. No. 707,466
4 Claims. (Cl. 23—338)

ABSTRACT OF THE DISCLOSURE

A method of separating berkelium values from an aqueous solution containing said values together with cerium values comprising making said solution 5 to 9 molar in nitric acid, oxidizing berkelium and cerium to the tetravalent oxidation state, and passing the resulting solution through an anion exchange column. The cerium is sorbed while the berkelium passes through.

BACKGROUND OF THE INVENTION

This invention was made in the course of, or under, a contract with the United States Atomic Energy Commission.

In the method of producing berkelium by irradiating americium-241 a complex mixture of actinide and lanthanide elements is formed from which berkelium must be separated. Liquid-liquid extraction and ion exchange techniques are used to separate berkelium from this mixture. The liquid-liquid extraction methods are capable of separating berkelium from most of the contaminants but, because of the close oxidation potentials of berkelium and cerium, have failed to separate these two elements. Ion exchange resins have been used, but good separation of berkelium and cerium is not achieved even with several passes through a column.

SUMMARY OF THE INVENTION

It is accordingly one object of my invention to provide an improved method of separating berkelium from cerium values.

Other objects of my invention will become apparent from the following description and claims.

In accordance with my invention I have provided a method of separating berkelium values from cerium values comprising forming a 5 to 9 molar nitric acid solution of a mixture of said values, oxidizing the berkelium and cerium values to the tetravalent state, and contacting the resulting oxidized solution with an anion exchange resin.

In this process the cerium values are strongly sorbed on the anion exchange resin, while the berkelium values are weakly sorbed and can readily be eluted with a 5 to 9 molar nitric acid solution. Substantially pure cerium can be obtained by subsequent elution with a weak, e.g., about 0.5 molar, solution of nitric acid.

DESCRIPTION OF THE PREFERRED EMBODIMENTS

In carrying out my invention an aqueous solution containing berkelium and cerium is made 5 to 9 molar in nitric acid. At nitric acid concentrations outside this range the sorption of cerium on an anion exchange bed decreases appreciably; concentrations greater than 9 molar have the additional disadvantage of rapidly degrading the resin. The optimum nitric acid concentration is 8 molar based on the high sorption of cerium at this concentration.

The berkelium and cerium values are oxidized to the tetravalent state and contacted with an anion exchange resin. Examples of suitable oxidants are sodium bromate and lead dioxide. The elements may be oxidized before contact of the solution with the anion exchange resin or during contact by providing an oxidant with the resin. In view of its convenience, in the preferred method of carrying out my invention an oxidizing agent such as lead dioxide is mixed with the anion exchange resin.

Any strong base anion exchange resin such as those having $N(CH_3)_3$ or $N(CH_3)_2(C_2H_4OH)$ groups may be used. The resin is preferably converted to the nitrate form before it is contacted with the berkelium- and cerium-containing solution.

After the anion exchange resin has been contacted with the solution containing the berkelium and cerium values, additional nitric acid in a concentration range of 5 to 9 molar, preferably 8 molar, is passed through the bed to remove berkelium values therefrom.

My process may be carried out in the presence of other metal values such as other actinides and lanthanides; however, it is preferably carried out after other elements have been separated from berkelium and cerium.

The temperature at which my process is carried out is not critical and excellent results are achieved at room temperature.

Having thus described my invention, the following example is offered to illustrate it in more detail.

Example

An exchange column was prepared by filling a 5 mm. ID by 150 mm. long glass tube to a depth of 50 mm. with 100–200 mesh strong base anion exchange resin containing quaternary amine groups. The resin was converted to nitrate form by washing several times with 5 M $HNO_3$ solution. Fifty milligrams of lead dioxide (oxidant) was mixed with the resin in the column. A 0.2 ml. sample solution containing berkelium (III) and cerium (III) nitrates in 8 M $HNO_3$ was introduced into the column and allowed to sorb. The column was then eluted with 5 ml. of 8 M $HNO_3$ and the eluate, containing the berkelium, was collected. Aliquots of each fraction removed from the column were prepared on stainless steel plates for alpha and beta measurement. The results of several runs, as described above, are shown in the table below.

TABLE.—RECOVERY AND DECONTAMINATION OF $Bk^{249}$ BY ANION EXCHANGE

| | Percent Found in $Bk^{249}$ Product | |
|---|---|---|
| | $Bk^{249}$ | $Ce^{144}$ |
| Run Number: | | |
| 1 | 99.8 | 0.001 |
| 2 | 99.9 | 0.001 |
| 3 | 99.4 | 0.004 |
| 4 | 99.9 | 0.003 |
| 5 | 99.9 | 0.004 |

More than 99% of the cerium was subsequently recovered by eluting the column with 10 ml. of 0.5 M $HNO_3$.

I claim:
1. A method of separating berkelium values from cerium values comprising forming a 5 to 9 molar nitric acid solution of a mixture of said values, oxidizing the berkelium and cerium to the tetravalent state, and contacting the resulting oxidized solution with an anion exchange resin, thereby selectively sorbing cerium values from said mixture.

2. The method of claim 1 wherein the aqueous solution is adjusted to a nitric acid concentration of about 8 molar.

3. The method of claim 1 wherein the oxidant for berkelium and cerium is lead dioxide.

4. The method of claim 3 wherein the lead dioxide is mixed with the anion exchange resin.

References Cited

Chemical Processing in the Transuranic-Element Program, S. Lawroski, Reactor Fuel Processing, vol. 7, No. 2, April 1964, pp. 94–96.

CARL D. QUARFORTH, *Primary Examiner.*

M. J. McGREAL, *Assistant Examiner.*